United States Patent [19]
Casad

[11] Patent Number: 5,244,192
[45] Date of Patent: Sep. 14, 1993

[54] INTERIOR CENTERLINE BASED SEATING APPARATUS

[75] Inventor: Charles L. Casad, Dalton City, Ill.

[73] Assignee: Wagner Castings Company, Decatur, Ill.

[21] Appl. No.: 706,044

[22] Filed: May 28, 1991

[51] Int. Cl.⁵ ............................................. B23B 31/40
[52] U.S. Cl. .................................................. 269/48.1
[58] Field of Search ...................... 269/22, 48.1, 48.3, 269/43, 47, 48; 279/2 R, 2 A; 242/72 B, 72 R; 294/93, 98.1; 82/44

[56] References Cited

U.S. PATENT DOCUMENTS

| | | | |
|---|---|---|---|
| 2,615,413 | 10/1952 | Adams et al. | 269/48.1 |
| 3,980,250 | 9/1976 | Persson | 269/48.1 |
| 4,304,398 | 12/1981 | Crowell | 269/48.1 |
| 5,054,756 | 10/1991 | Riemscheid et al. | 269/48.1 |

Primary Examiner—Robert C. Watson
Attorney, Agent, or Firm—Wallenstein, Wagner & Hattis, Ltd.

[57] ABSTRACT

An apparatus (10) and method for centering and gripping a work piece (WP) having an internal cavity (60) is disclosed. The apparatus includes a generally longitudinal post shaft (11) in an internal chamber (21) that has a head portion (42) for supporting the cavity end wall (62) and a plurality of pivot bars (22) and clamp bars (31) for engaging the cavity side wall (61) and cavity throat (63). An air driven slidable push rod (41) disposed within the shaft (11) in an internal chamber (21) causes the bars (22,31) to move from a retracted position to an expanded position. The apparatus can be inserted into the work piece (WP) while the bars (22,31) are in the retracted position and then gripped and centered by activating the push rod (41) and expanding both sets of bars (22,31).

15 Claims, 2 Drawing Sheets

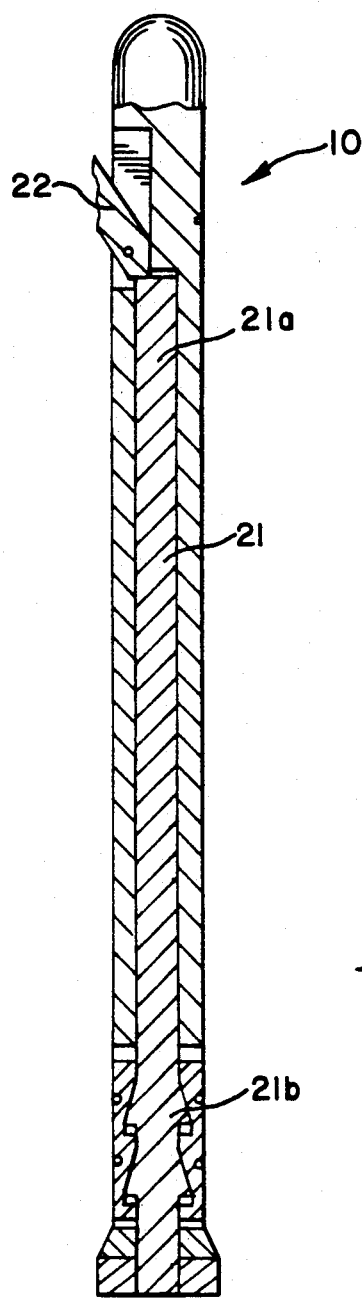
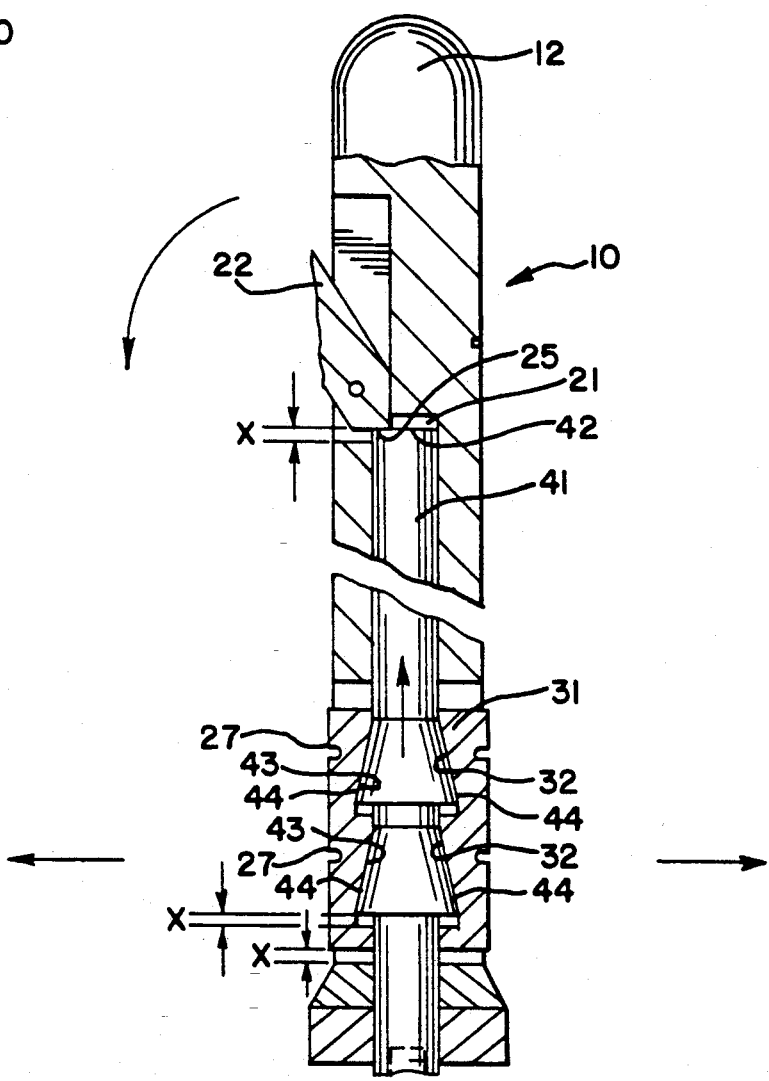

INTERIOR CENTERLINE BASED SEATING APPARATUS

TECHNICAL FIELD

The present invention relates to the seating of work pieces and, more particularly, to an interior centerline based apparatus and method for use in combination with a work piece having an internal cavity.

BACKGROUND PRIOR ART

Items, such as projectiles, are made by either forging or by casting. These items contain not only an exterior surface, but also an internal cavity. At times, it is necessary to perform various operations on the exterior surface, such as chucking, grinding and machining or turning. When such operations are desired, the item to be worked on must be either secured in a stationary position so that the operations can be performed on the stationary item or the item must be secured to a moving apparatus so that a moving or stationary apparatus can perform the operations. In either of these cases, the item to be worked on must be secured and put in a desired position.

There are three possible avenues available to secure the item. One approach is to grip the exterior of the item. Unfortunately, when this is done, the apparatus for gripping the item can get in the way of and interfere with the performance of the desired operation. For example, if the item is clamped and is being finished with a fine grinder, the clamps will interfere with the grinding device. To complete the finishing operation, the clamps must be removed and relocated. This additional step, if not done exactly, can cause a lack of uniformity in the dimensional finish and can ruin the item. It is, nonetheless, a step preferably avoided.

Another approach is to add a piece of material, a component or a handle device to either or both the interior and the exterior of the item during casting or forging. In such cases, the apparatus gripping the item grabs the extra material, component or separate handle device while an operation, such as grinding, is being performed on the item. However, as with the previous examples, the introduction of this extra element may interfere with the operations. Moreover, in most circumstances the extra element will have to be removed prior to finalizing the item. Again, such an additional step may affect the quality or performance of the final product. There is the further aspect with this approach of waste in that the extra material or separate handle must be removed and disposed of. In some circumstances, this extra component can be recycled.

Finally, a third approach is to grip the interior chamber of the item to be worked on. This can be difficult in that oftentimes the throat of the internal cavity is smaller in cross sectional area than the cross sectional area of cavity's main section. In short, the throat typically has a smaller inside diameter than the chamber's main section. Other problems are also present because it is difficult to center the item during the gripping process.

There is therefore a significant need for efficiently gripping an item to be worked on that can also simultaneously center the object.

SUMMARY OF THE INVENTION

According to the present invention an interior centerline based seating apparatus for use in combination with a work piece having an internal cavity with a cavity side wall and a throat at one end and a cavity end wall at the other end has been developed. The apparatus includes a post shaft with a first end and a second end. According to one aspect of the present invention, the post shaft has a plurality of pivot bars rotatably connected thereto that are disposed between these ends and has a plurality of clamp bars seated therein that are disposed between the pivot bars and the second end. Each of the pivot bars is rotatable between a retracted position and an expanded position and each of the clamp bars is moveable between a retracted position and an expanded position. Each set of bars or engaging members is biased to the retracted position. When both the pivot bars and the clamp bars are in their respective retracted positions, the post shaft easily fits through the cavity's opening and throat section. And, when the first set of engaging members, namely the pivot bars, are in the expanded position, they are contacting, being either touching or within a prescribed tolerance thereof, the cavity side wall. When the other set of engaging members, namely the clamp bars, are in the expanded position, they are contacting the inside wall of the throat of the cavity.

According to another aspect the present invention, the pivot bars and the clamp bars are actuated by a post shaft that is situated in an internal chamber within the post shaft. Recesses are also provided in the internal surfaces of the clamp bars. This push rod is moveable between a first, engaging position and a second, non-engaging position. An air cylinder having pressurized air therein is positioned adjacent one end of the push rod to drive the rod between each of these positions. At one end, the push rod has a head for actuating the pivot bars and near the other end, the push rod has a plurality of outwardly extending portions, or flutes, for actuating the clamp bars.

In the non-engaging position, the push rod situated within the post shaft is not causing the pivot bars and the clamp bars to expand outwardly; both sets of bars remain in the retracted position. In the engaging position, the head of the push rod contacts a camming surface on each of the pivot bars and the flutes' inclined abutments contact an internal abutment on each of the clamp bars to cause each set of bars to extend outwardly.

According to another aspect of the present invention, a locating sphere at the first end of the shaft is provided for positioning within the internal cavity so that the sphere contacts the cavity end wall.

Thus, the movement of the push rod in the internal chamber to its engaging position results in its head portion contacting and causing the pivot bars to rotate from their retracted position to their engaged position to engage and contact the cavity side wall and further results in the flutes contacting and causing the clamp bars to move outwardly from their retracted position to their expanded position to engage and contact the throat of the internal cavity. This action not only causes the work piece to be gripped internally, but also results in the realignment of the work piece so that it is properly centered on the post shaft.

Accordingly, a work piece can be easily seated by positioning it above the assembly and lowering it onto the post shaft so that the cavity end wall contacts the locating sphere at the first end of the shaft. Because the pivot bars and clamping bars are biased in their retracted positions, the assembly can fit through the internal cavity opening of the work piece. Compressed air is introduced behind the internal push rod from an air cylinder to drive the push rod towards the first end of the shaft which causes both the pivoting bars and the clamping bars to move outwardly into the cavity side wall and cavity throat, respectively. Each of the pivot bars and each of the clamping bars contacts and frictionally engages the cavity side wall which both centers the work piece within the fixture and secures the work piece in the desired position. The work piece is thus ready to be worked on.

When the work is completed, the above process is merely reversed by releasing the air behind the push rod.

Other advantages and aspects of the present invention will become apparent upon reading the following description of the drawings and detailed description of the invention.

BRIEF DESCRIPTION OF DRAWINGS

FIG. 3 shows a sectional side view of the push rod of the apparatus; and,

FIG. 4 shows a partial side sectional view of the apparatus with the distances traveled by the push rod highlighted therein.

DETAILED DESCRIPTION

Figure 1:
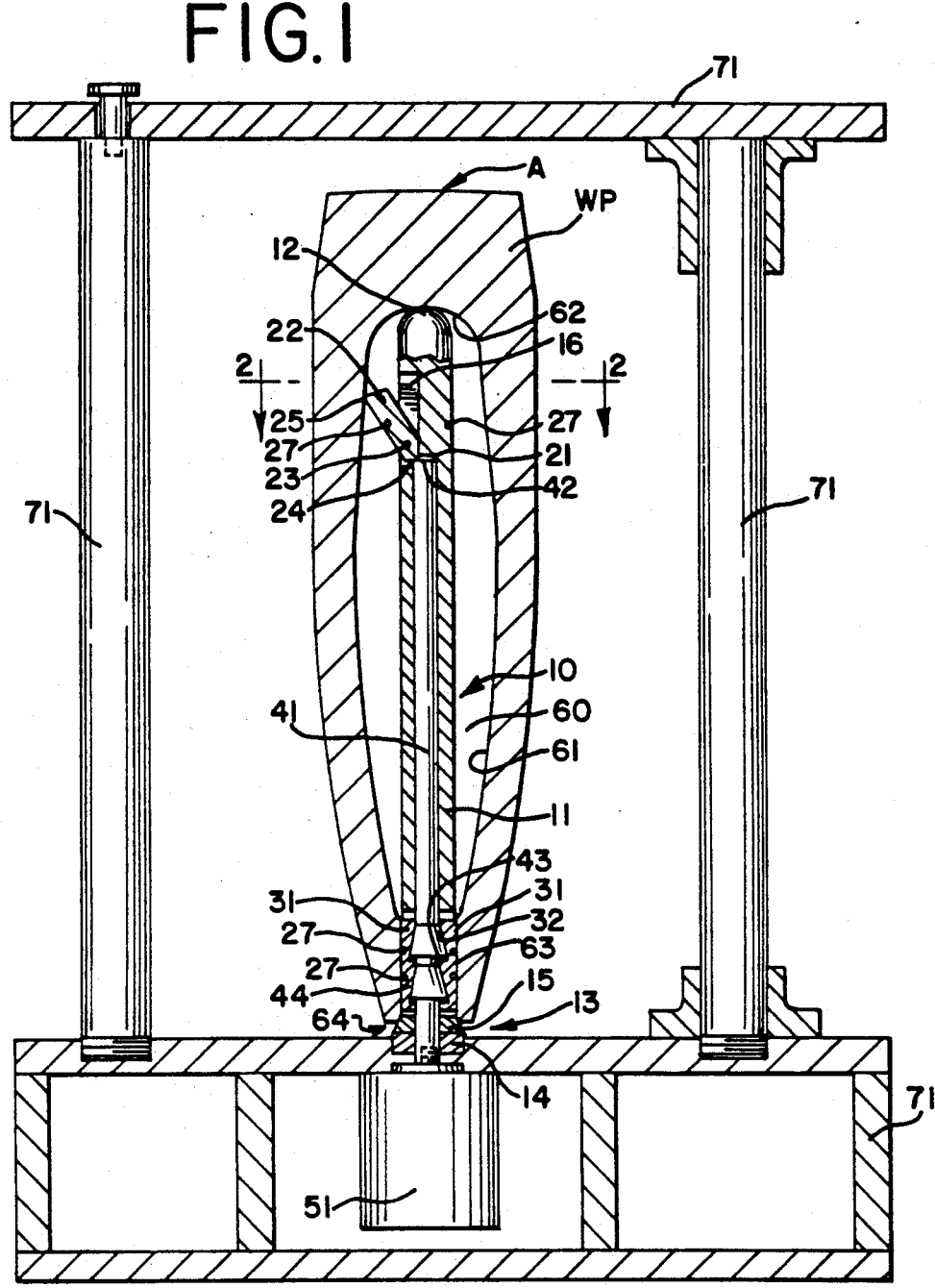
FIG. 1 shows a side sectional view of the work piece, the centerline based seating apparatus made in accordance with the teachings of the present invention and the external fixture.

While this invention is susceptible of embodiment in many different forms, there is shown in the drawings and will herein be described in detail a preferred embodiment and procedure of the invention with the understanding that the present disclosure is to be considered as an exemplification of the principles of the invention and is not intended to limit the broad aspect of the invention to embodiment and procedure illustrated.

As shown in FIG. 1, the interior centerline based apparatus of the present invention, designated generally by the reference number 10, is designed to securely center and hold a work piece WP. This holding is done on the inside of the work piece WP rather than by the customary method, being on the outside of the work piece WP.

The work piece WP, typically a casted or forged item, includes an internal cavity 60 that has a side wall 61, end wall 62, and an opening 64. The side wall 61 tapers inwardly adjacent the opening 64 so as to form a throat 63.

A support structure or fixture 71 is also generally shown in FIG. 1. Equipment, such as a lathe or a grinding machine, can be attached to this fixture 71. The seating apparatus of the present invention 10 is attached to this fixture 71 by conventional means.

The present device 10 includes a means for seating the work piece WP. This means includes a post shaft 11 with a locating sphere 12 at one end and a base 13 at the other end. Preferably, the locating sphere 12 is rounded at the outermost portion so that point contact can be made with the work piece WP. The base 13 includes a support member 14 for securing the post shaft 11 to the fixture 71 and a conical member 15 for preventing the work piece WP from contacting the fixture 71. As shown in FIG. 1, the work piece WP is placed over the post shaft 11.

Figure 2:
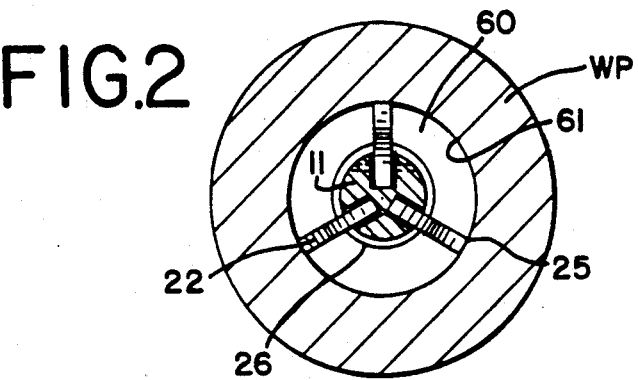
FIG. 2 shows a sectional top view of the work piece and the apparatus as viewed along line 2—2 in FIG. 1.

The post shaft 11 is partially hollow and includes an internal chamber 21. This internal chamber is shown clearly in FIG. 3. The device further includes expandable means attached to the seating means for frictionally engaging the cavity side wall. Specifically, two separate sets of side wall engaging means are longitudinally spaced apart on the post shaft 11. In particular, disposed between the end of the post shaft 11 with the locating sphere 12 and the end of the post shaft with the base 13, the post shaft 11 has secured to it a plurality of engaging elements or pivot bars 22. These bars 22 are made to fit within cut-out sections 16 in the post shaft 11. In the embodiment illustrated, there are three pivot bars 22 rotatably connected to the shaft 11. Each bar 22 is rotatable between a retracted position and an expanded position. When the bars 22 are in the retracted position, they are positioned in the cut-out sections or machined grooves 16 so that outermost edges and points do not interfere with the opening 64 or throat 63 of the work piece WP when the apparatus 10 is inserted therein. In FIGS. 1 and 2, the bars 22 are shown in the expanded or locked position. In this expanded position, the pivot bars 22 stop against the post shaft 11 as shown in FIG. 1. The bars 22 are locked in this position and remain rigid.

The bars 22 are constructed to have an aperture therein so as to permit a dowel pin 23 to pass therethrough into the post shaft 11. Each bar rotates about this pin 23. Each bar 22 further includes a camming surface 24 at one end and a contacting point or tip 25 (a sharp edge) at the other end. In particular, each pivoting bar 22 expands to contact the cavity side wall 61 at a contacting point 25. Contacting occurs when the bar 22 either touches the wall 61 or comes within 0.0001 inches of the wall.

It should be noted that in the preferred embodiment, the work piece WP is constructed with great precision. Thus, the inside diameters and distances, such as the distance between the cavity end wall and the cavity opening and the distance between the cavity side walls and between the throat walls, are known. Consequently, the apparatus of the present invention can be customized and sized accordingly so that small tolerances, such as 0.0001 inches can be successfully used.

The pivoting bars 22 are biased in the retracted position by an O-ring or elasticized band 26, shown in FIG. 2, that are made of an elasticized material such as spring steel or rubber. To prevent the O-ring 26 from slipping, grooves 27 are provided in both the pivoting bars 22 and the post shaft exterior 11.

There is also a second set of engaging members longitudinally spaced apart from the pivoting bars 22. As shown in FIGS. 1 and 4, a plurality of clamp bars 31 are disposed between the pivot bars 22 and the base 13 of the post shaft 11. Preferably, there are three such clamp bars 31. Each clamp bar 31 is seated in a slot (not shown) in the post shaft 11 and is movable between a retracted position and an expanded position. In the retracted position, the clamp bars 31 are positioned in the slots so that their exterior surfaces are generally flush with the exterior surface of the post shaft 11. In the expanded position, the clamp bars are urged against the throat 63 of the work piece WP. Serrations or teeth are provided in the outermost portion or face of the clamping bars 31 to enhance their gripping capabilities. Additionally, internal recesses which include internal inclined abutment surfaces 32 are provided in the innermost portions of each clamp bar 31 to both hold and interact with a push rod 41.

As with the pivoting bars 22, the clamp bars 31 are biased in the retracted position. This is accomplished by encircling the clamp bars 31 with O-rings or elasticized bands (not shown) placed in grooves 27.

A push rod 41 is disposed within an internal chamber 21 of the post shaft 11. This internal chamber 21 is shown in detail in FIG. 3 and has a first section 21a that is generally a longitudinal cylindrical chamber 21a and a second section 21b that includes a plurality of chamber arms or contoured portions projecting outwardly from the longitudinal cylindrical chamber.

The push rod 41 has a head 42 at its free end and has a plurality of flutes 43 or contoured portions projecting outwardly from the other end. Apart from the flutes 43, the push rod 41 is generally cylindrical. Two of the flutes 43 are shown in FIGS. 1 and 4. Each flute 43 includes an inclined abutment 44 thereon for cooperating with the corresponding inclined abutments 32 of the clamp bars 31.

Generally shown in FIG. 4, the push rod 41 is moveable between an engaging position and a non-engaging position. FIG. 4 illustrates the push rod 41 in the engaging position, after it has traveled a distance X. This movement by the push rod 41 is caused by hydraulics. Thus, a fluid, such as air, can be introduced behind one end of the push rod 41, the end opposite the head 42, to move the entire rod upwardly. When the air is driven in from an air cylinder 51 containing pressurized air or motor driven compressed air therein behind the push rod 41, the entire push rod moves from its non-engaging position to its engaging position, or, as viewed in FIGS. 1 and 4, the push rod 41 moves upwardly (see arrow on push rod in FIG. 4).

Consequently, by this action of the push rod 41, the head 42 of the push rod 41 contacts and pushes the cam surfaces 25 of the pivot bars 22 which causes the bars 22 to rotate towards their engaging positions (see arrow adjacent pivot bar 22 segment in FIG. 4), which is when their tips contact the side walls 61. Similarly, this same upward motion by the push rod 41 causes the inclined abutments 44 of the flutes 43 to move within the recesses 21b provided in the post shaft 11 and in the individual clamp bars 31 and contact the cooperating internal inclined abutments 32 of the clamp bars 31 to drive the clamp bars outwardly towards their engaging positions into the internal wall of the throat 63 (see arrow adjacent clamp bars 31 in FIG. 4).

Accordingly, in the engaging position, the pivot bars 22 contact and frictionally engage the cavity side wall 61 and the clamp bars 31 contact and frictionally engage the throat wall 63 to secure the work piece WP on the assembly. Ideally, the work piece WP is held in place by contacts or actual touchings at seven internal points, namely, at the end of the locating sphere 12, at the end of each of the three pivot bars 22 and at the serrated edges of each of the three clamp bars 31. Because one or more of the pivot bars 22 might not be in actual physical contact with a cavity side wall 61, i.e., if there is a distance of less than 0.0001 inches separating them, the actual touchings might be less then seven.

Simultaneously, the work piece WP is centered onto the assembly 10. Specifically, before the work piece WP is positioned onto the assembly 10, the post shaft 11 is in the retracted position. Consequently, the three biased pivot bars 22 are in the retracted position and the three biased clamp bars 31 are in the retracted position. With each of the bars 22, 31 in the retracted position, the entire post shaft assembly 11 will fit through the cavity opening 64. Thus, the work piece WP can be put over the post shaft 11 and lowered down onto the post shaft so that the locating sphere 12 is up against the cavity end wall 62 and the entire piece WP is resting on the post shaft. Air from the air cylinder 51 is introduced behind the push rod 41 which causes the push rod to move upwardly and engage the pivot bars 22 and clamp bars 31 to move into their expanded position. This action causes an adjustment and centering of the work piece WP. If for any reason the piece WP is resting on the locating sphere 12 at a point other than the center, the expanded bars 22,31 will force a movement of the piece WP so that the piece is resting on the sphere 12 at the center point.

In short, the expanding bars 22,31 realign the work piece WP when they collectively contact either the cavity side wall 61 or the internal wall of the throat 63.

Once the piece WP is centered and secured, the length of the cavity can be easily established because it is the distance from the cavity opening 64 to the end of the locating sphere 12. Moreover, the centerline of the cavity 21 can be easily established because it is merely the centerline of the assembly 10, specifically the post shaft 11. In addition, by simple extrapolation, this centerline can be translated to the exterior of the work piece WP. For example, by carrying the direction of the centerline upwardly beyond the touching point of the locating sphere 12, the external centerline point A can be easily established.

Thus, with the work piece both centered and secured in the desired position and with both the interior and exterior centerlines known, the piece can be worked on. It can be rotated or held stationary, and it can be, among other things, ground, chucked, lathed, drilled into, and finished.

By releasing the compressed air behind the push rod 41 the above describe process can be reversed and the push rod 41 retracted. This, in turn, causes the pivot bars 22 and the clamp bars 31 to rotate or move from their respective contacting and expanded positions to their retracted positions. At this juncture, the work piece WP can be lifted off of and removed from the entire assembly 10.

As to materials, it is preferable to make the push rod, pivot bars and clamp bars out of steel.

While the specific embodiments and procedures have been illustrated and described, numerous modifications can be made without significantly departing from the spirit of the invention and the scope of protection is only limited by the scope of the accompanying claims.

I claim:

1. An interior centerline based seating apparatus for use in combination with a work piece having an internal cavity with a cavity side wall and with a throat at one end and a cavity end wall at the other end comprising:

a post shaft fitting within the internal cavity having a first end and a second end, said first end of said shaft contacting the cavity end wall;

a plurality of pivot bars rotatably connected to said post shaft, each said pivot bar rotatable between a retracted position and an expanded position;

a plurality of clamp bars seated within said post shaft, each said clamp bar movable between a retracted position and an expanded position;

a push rod situated within said post shaft having a head portion and an outwardly extending portion, said push rod being moveable between an engaging position and a non-engaging position; and, an air cylinder having pressurized air for driving said push rod from said non-engaging to said engaging position, whereby said movement of said push rod to said engaging position results in said head portion contacting and causing said pivot bars to rotate from said retracted position to said expanded position to engage the cavity side wall and in said outwardly extending portion contacting and causing said clamp bars to move from said retracted position to said expanded position to engage said throat of internal cavity.

2. An interior centerline based seating apparatus for use in combination with a work piece having an internal cavity with a cavity side wall and with a throat at one end and a cavity end wall at the other end comprising:

a post shaft capable of fitting within the internal cavity with a first end, said shaft being positioned within the internal cavity so that said first end contacts the cavity end wall;

a plurality of pivot bars for gripping the cavity side wall rotatably connected to said post shaft disposed between said first end and said second end, each said pivot bar rotatable between a retracted position and an expanded position and being biased in said retracted position;

a plurality of clamp bars for gripping the cavity throat seated within said post shaft disposed between said pivot bars and said second end, each said clamp bar moveable between a retracted position and an expanded position and being biased in said retracted position;

a push rod moveable between an engaging position and a non-engaging position situated within said post shaft, said push rod having a head portion and an outwardly extending portion; and, an air cylinder having pressurized air therein for driving said push rod from said non-engaging position to said engaging position, whereby said movement of said push rod to said engaging position results in said head portion contacting and causing said pivot bars to rotate from said retracted position to said expanded position to contact the cavity side wall and said outwardly extending portion contacting and causing said clamp bars to move outwardly from said retracted position to said expanded position to contact the throat of the internal cavity.

3. An interior centerline based seating apparatus for use in combination with a work piece having an internal cavity with a side wall and with a throat at one end and a cavity end wall at the other end comprising:

a post shaft with a first end for positioning against the cavity end wall;

a plurality of pivot bars rotatably connected to said post shaft, each said pivot bar rotatable between a retracted position and an expanded position;

means for contacting the cavity throat at a plurality of points connected to said post shaft; and, means for controlling said pivot bars and said cavity throat contact means.

4. An internal centerline based seating apparatus as defined in claim 3, wherein said cavity throat contact means is a plurality of clamp bars seated within said post shaft, each said clamp bar moveable between a retracted position and an expanded position.

5. An internal centerline based seating apparatus as defined in claim 4, wherein said controlling means is a) a push rod moveable between a first position and a second position situated within said post shaft for engaging said pivot bars and said clamp bars and causing said pivot bars to rotate between said positions and for causing said clamp bars to move between said positions, and b) an air cylinder having pressurized air therein for driving said push rod from said first position to said second position.

6. An internal centerline based seating apparatus as defined in claim 5, wherein said push rod has a head portion and each said pivot bar is biased in said retracted position and has a camming surface for contacting said head portion.

7. An internal centerline based seating apparatus as defined in claim 6, wherein said push rod has an outwardly extending portion and each said clamp bar is biased in said retracted position and has means for gripping said throat of said cavity and has an internal abutment for contacting said outwardly extending portion.

8. An internal centerline based seating apparatus as defined in claim 7, wherein said means for gripping is a plurality of serrations.

9. An apparatus for gripping a work piece having an internal cavity with a cavity side wall and a cavity end wall comprising:

means for seating the work piece on the apparatus that fits within the internal cavity, said seating means being a generally longitudinal post shaft having a head portion for contacting the cavity end wall and for supporting the work piece;

expandable means attached to said seating means for frictionally engaging the cavity side wall, said expandable means being at least two sets of engaging members connected to said seating means, each set of engaging members being longitudinally spaced apart from said other set of engaging members and having a plurality of engaging elements that are moveable between a retracted position and a contacting position, said contacting position being when said engaging elements are contacting the cavity side wall, and said engaging elements being biased in said retracted position; and, means for controlling said expandable means, said controlling means including a push rod disposed within said post shaft for moving said engaging elements between said retracted position and said contacting position.

10. The apparatus of claim 9 wherein a) one set of engaging members is a plurality of pivot bars rotatably connected to said post shaft and b) said other set of engaging members is a plurality of clamp bars seated within said post shaft.

11. The apparatus of claim 10 wherein a) said push rod includes a head portion and an outwardly extending portion, b) each said push bar includes a camming surface for cooperating with said head portion and, c) each said clamp bar includes an internal abutment for cooperating with said outwardly extending portion.

12. The apparatus of claim 11 wherein said pivot bars are biased in said retracted position by an encircling elastic member and said clamping bars are biased in said retracted position by an encircling elastic member.

13. The apparatus of claim 12 wherein said pivot bars and said clamping bars further include grooves for receiving said encircling elastic members.

14. The apparatus of claim 13 wherein said clamping bars have serrations.

15. The apparatus of claim 14 wherein said controlling means further includes an air source adjacent said push rod for moving said push rod between a non-engaging position and an engaging position.

* * * * *